United States Patent
Kim et al.

(10) Patent No.: US 12,439,283 B2
(45) Date of Patent: Oct. 7, 2025

(54) LOAD ESTIMATION AND BALANCING IN VIRTUALIZED RADIO ACCESS NETWORKS

(71) Applicant: MICROSOFT TECHNOLOGY LICENSING, LLC, Redmond, WA (US)

(72) Inventors: Daehyeok Kim, Redmond, WA (US); Anuj Kalia, San Francisco, CA (US); Xenofon Foukas, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 586 days.

(21) Appl. No.: 17/827,681

(22) Filed: May 28, 2022

(65) Prior Publication Data

US 2023/0388827 A1     Nov. 30, 2023

(51) Int. Cl.
*H04W 24/08* (2009.01)
*H04L 47/28* (2022.01)

(52) U.S. Cl.
CPC .............. *H04W 24/08* (2013.01); *H04L 47/28* (2013.01)

(58) Field of Classification Search
None
See application file for complete search history.

(56) References Cited

U.S. PATENT DOCUMENTS

| 11,689,968 | B2 * | 6/2023 | Park | H04M 15/62 370/329 |
| 2018/0287696 | A1 * | 10/2018 | Barbieri | H04W 36/08 |
| 2021/0266792 | A1 | 8/2021 | Park et al. | |
| 2022/0094597 | A1 * | 3/2022 | Ha | H04L 43/00 |
| 2022/0159785 | A1 | 5/2022 | Foukas et al. | |
| 2022/0338210 | A1 * | 10/2022 | Elgarisi | H04L 1/1812 |

OTHER PUBLICATIONS

Foukas, et al., "Concordia: Teaching the 5G vRAN to Share Compute", In Proceedings of the ACM SIGCOMM Conference, Aug. 23, 2021, pp. 580-596.
"International Search Report and Written Opinion Issued in PCT Application No. PCT/US23/018248", Mailed Date: Jul. 21, 2023, 13 Pages.

* cited by examiner

*Primary Examiner* — Luna Weissberger
(74) *Attorney, Agent, or Firm* — Han Gim; Newport IP, LLC (57) ABSTRACT

During a first transmission time interval (TTI) of a vRAN, data traffic between a radio unit (RU) of a cellular network and a first vRAN instance of the vRAN is monitored. The first vRAN instance executes on a first server of the vRAN and the first vRAN instance is configured to perform PHY layer processing and L2 processing of the data traffic. Based on the data traffic between the RU of the cellular network and the first vRAN instance during the first TTI, a workload at the first vRAN instance during a second TTI is estimated.

19 Claims, 8 Drawing Sheets

LOAD ESTIMATION AND BALANCING IN VIRTUALIZED RADIO ACCESS NETWORKS

BACKGROUND

Integration between cloud networks and a radio access network (RAN) and/or a core network for wireless telecommunications is increasingly in demand. The RAN provides wireless connectivity to mobile computing devices by converting data into data packets. The core network coordinates among various parts of the RAN and provides connectivity to a packet-based network (e.g., the Internet). A growing number of 5G deployments are being implemented using virtualized radio access networks (vRANs), where traditional specialized hardware for RAN processing is replaced with software-based functionality running on commodity servers. vRANs are typically implemented at far edge datacenters that have limited capacity for space and power. Additionally, PHY (OSI layer 1) processing workloads can vary over time, and server resources (e.g., CPUs) can be underutilized and total energy efficiency can be degraded.

It is with respect to these considerations and others that the disclosure made herein is presented.

SUMMARY

The present disclosure pertains to distribution of workloads to virtualized RANs (vRANs) via programmable switches at far-edge cloud datacenters. In various embodiments, systems and methods for workload estimation and balancing are disclosed for vRAN processes (e.g., PHY, L2) that meet performance requirements of the PHY layer of a cellular network infrastructure (e.g., LTE and 5G). The systems and methods provide for workload estimation and balancing within a transmission time interval (TTI) of the vRAN. The workload estimation and balancing may operate entirely in the data plane.

In one embodiment, a programmable switch that routes fronthaul traffic of the vRAN may be configured to monitor the information passing through the programmable switch. Based on this information, the programmable switch may detect workload changes within a TTI and use the information to balance workloads across servers.

The techniques disclosed herein can enable vRANs to avoid workload overload situations which may result in processing delays and/or lost data. The techniques disclosed herein can enable vRANs to more efficiently utilize available server capacity, reduce energy utilization, and reduce the physical footprint of a far edge datacenter. Other technical effects other than those mentioned herein can also be realized from implementations of the technologies disclosed herein.

This Summary is provided to introduce a selection of concepts in a simplified form that are further described below in the Detailed Description. This Summary is not intended to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying FIGURES. In the description detailed herein, references are made to the accompanying drawings that form a part hereof, and that show, by way of illustration, specific embodiments or examples. The drawings herein are not drawn to scale. Like numerals represent like elements throughout the several FIGURES.

DETAILED DESCRIPTION OF ILLUSTRATIVE EMBODIMENTS

A mobile wireless telecommunication network may use a cloud service for implementing a RAN. In this case, the cloud service connects cell towers, which may also be referred to as radio units (RUs), with which mobile devices (e.g., smartphones) devices (which may also be referred to as User Equipment (UE)) connect to the public network (e.g., the Internet) and/or private networks. The cloud service provides virtual servers and other computing resources for dynamically scaling the computing capacity as needed based on the volume of data traffic.

In an embodiment, a cloud RAN infrastructure may represent an implementation of cloud services for the RAN. The cloud RAN infrastructure may include geographical and physical constraints as well as latency constraints imposed by RAN standards. The cloud RAN infrastructure may include a connection to at least one cell tower associated with an RU and cloud servers associated with one or more of a Distributed Unit (DU), a Central Unit (CU), and a RAN Intelligent Controller (RIC). The cell tower may be installed in various locations where mobile devices can connect over wireless cellular communications and the RU of the cell tower may connect to a DU of a RAN server at a far-edge datacenter. To enable real-time processing of RAN data traffic, the far-edge datacenter may be relatively close (e.g., a few miles) to the cell tower. In many of today's systems, specialized RAN hardware is being replaced with software systems running on commodity servers deployed in edge datacenters, which are located in closer geographic proximity to the radio cell towers. This approach, which may be referred to as a virtualized RAN (vRAN), can provide benefits such as reducing vendor lock-in, rapid feature development and upgrades, easier maintenance, and lower costs.

The DU may be associated with network switches and processes data in a series of operations associated with at least layer one (i.e., the PHY or physical layer) and layer two (the MAC or data link layer) of the Open Systems Interconnection (OSI) model. The PHY layer may connect a data link layer device, e.g., MAC (medium access control), to a physical medium, e.g., optical fiber, copper cable.

As used herein, a switch may be a hardware device that connects devices on a digital network by using packet switching to receive and forward data to a destination device. Packet switching involves grouping the transmitted data into packets. A header of each packet may include a MAC address, which may be a unique identifier used to direct the packet in the data link layer (layer two of the Open Systems Interconnection (OSI) model) to a destination device. A payload of each packet may include the transmitted data, which may be extracted and used by application software. Some switches may comprise application-specific integrated circuits (ASICs), which are integrated circuit chips programed for a specific use. These switches may also be referred to as fixed-function switches, which process packets according to fixed rules associated with a limited set of networking protocols. In contrast, programmable switches may be based on a protocol independent switch architecture (PISA), which enables developers to program each stage of packet processing. In this way, unique treatment of different types of packets may be designed and implemented.

To meet 5G requirements, layers one and two of the OSI model need to be processed in essentially real time. In particular, workloads should be processed in a correct and timely manner, which is critical in the RAN in various scenarios including server failover and maintenance. Traditionally, network traffic allocation is handled by dedicated servers running load-balancing software. However, rerouting RAN traffic to such servers increases both energy and capital costs, degrades the end-to-end performance, and requires additional physical space, all of which are undesirable or even infeasible for a RAN far-edge datacenter—particularly in view of the heightened 5G performance requirements.

Typical vRAN deployment models present some challenges for providing high availability processing while efficiently utilizing computing resources. As discussed in more detail herein, the present disclosure addresses the above and other issues by distributing workloads to virtualized RANs ("vRANs") via programmable switches at far-edge cloud datacenters. Since switches are located in the path of data traffic, real-time network information (e.g., SNR (signal-to-noise ratio), type of modulation, type of coding scheme, number of channel layers used, and transmit block size can be leveraged for real-time RAN workload balancing.

By leveraging the proximity and programmability of the switches, overload detecting and workload balancing can be applied on the RAN workloads in real-time without incurring the performance, energy, and capital cost overheads of traditional systems. In particular, the overload detection and workload balancing logic can be designed to enable a switch to inspect packet headers of incoming traffic, evaluate real-time network information, predict an overload condition in a subsequent time slot, and re-balance workloads, without impacting the timing requirements of a vRAN deployment. As network conditions change, e.g., vRANs become overloaded (e.g., queue length increases), servers hosting the vRANs fail, power down (e.g., at night), or undergo maintenance, or the volume of data traffic fluctuates (e.g., during peak mobile usage periods), the overload detection and workload balancing logic cam enable a programmable switch to dynamically redirect workloads among servers in the far edge data center for processing. As a result, vRAN processing efficiency and fault tolerance may be improved even in instances of changing network conditions and spikes in data traffic.

Figure 1:
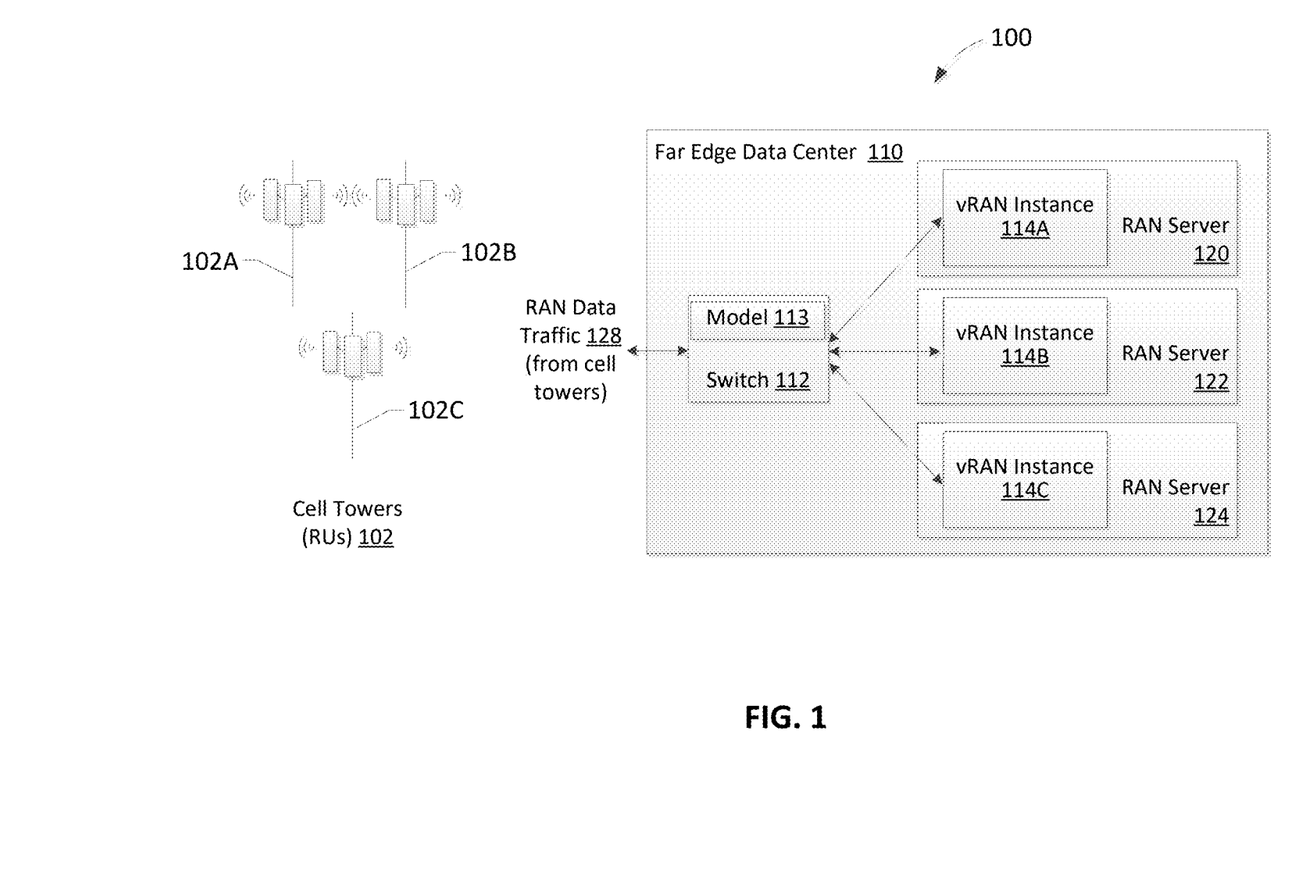
FIG. 1 depicts an example vRAN illustrating an embodiment of the disclosure.

FIG. 1 illustrates an example of a far-edge datacenter 110 of RAN environment 100 in accordance with the present disclosure. The far-edge datacenter 110 may include at least a switch 112, vRAN instances 114A-C, and RAN servers 120, 122, and 124. The switch 112 connects the cell towers (e.g., the cell towers 102A-C, as shown in FIG. 1) with RAN server 120 (which hosts vRAN instance 114A), RAN server 122 (which hosts vRAN instance 114B), and RAN server 124 (which hosts vRAN instance 114C), at far-edge datacenter 110. As illustrated, vRAN instances 114A-C of FIG. 1 are hosted by multiple servers 120, 122, 124.

In some embodiments, the switch 112 is a programmable switch. Since switch 112 is located in the path of RAN data traffic 118, real-time network information (e.g., SNR (signal-to-noise ratio), type of modulation, type of coding scheme, number of channel layers used, transmit block (data) size (in bytes)) can be leveraged for RAN workload balancing.

For example, one or more programs encoding workload estimation and balancing logic can be designed to enable switch 112 to inspect packets of incoming RAN data traffic 118, evaluate real-time network traffic information, estimate workload for the next slot, and rebalance workloads across available servers. As network conditions change, e.g., one or more of vRAN instances 114A-C can become overloaded (e.g., queue length increases), one or more of the servers fail or undergo maintenance (e.g., servers 120, 122, 124 hosting the vRANs 114A-C), or the volume of RAN data traffic 118 may fluctuate (e.g., during peak mobile usage periods), the workflow estimation and balancing logic may enable switch 112 to dynamically redirect workloads to alternative vRAN instances for processing. As a result, with improved vRAN allocation, RAN processing efficiency and fault tolerance may improve—even in instances of changing network conditions and spikes in RAN data traffic 118.

In an embodiment, the switch 112 may be a programmable network device. While the switch 112 may be implemented as a software switch, such an implementation would require server capacity or an additional server and may not meet timing requirements due to additional latencies. As switch 112 is located in the path of RAN data traffic 118, the switch 112 can be leveraged for monitoring information that may be useful for estimating processing time of future slots. Additionally, by leveraging the programmability of switch 112, the logic for monitoring the information, estimating workloads and processing time, and rebalancing workloads can be implemented in the switch 112 without incurring the performance overhead of server-implemented software-based mechanisms.

In an embodiment, L1 (PHY) and L2 (MAC) layers may coordinate through a standard interface referred to as a functional application platform interface (FAPI). The L1 and L2 layers may exchange FAPI messages to coordinate data transmissions for future slots. The FAPI messages contain at least some of the information that may be useful for estimating processing time of future slots. In an embodiment, The L1 and L2 layers may exchange FAPI messages via a user space shared memory channel.

Based on the information in the FAPI messages, a prediction model 113 may be trained with collected data including values for the features and measured processing time for each slot. The prediction model may be implemented and deployed at the programmable switch. Once deployed, at runtime, estimation logic included with the model may estimate the processing time of the next slot. If an overload condition is detected, the estimation logic may rebalance workloads across servers. Estimating and balancing loads at the switch has several advantages, including energy savings, smaller physical footprint, and performance (i.e., low latency). In one embodiment, the prediction model may be a tree-based classification model that may be programmed in the programmable switch 112.

In an embodiment, key features extracted from the FAPI messages for each slot may include:
SNR (signal-to-noise ratio)
Type of modulation
Type of coding scheme
Number of channel layers used
Transmit block (data) size (in bytes).

The servers 120, 122, 124 in the far edge datacenter 110 may run layers of a cellular stack that have strict real-time requirements for PHY and L2 layers. Higher layers of the vRAN stack (i.e., L3 and above), as well as the core network, may have less stringent latency requirements and can run in a datacenter situated farther from the RUs 102. The PHY layer may include complex software applications that perform computationally intensive signal processing tasks, such as channel estimation, modulation/demodulation, and forward error correction. The L2 layer may be primarily responsible for scheduling the frequency and time resources among UEs. The L2 layer may also connect to higher vRAN layers, which in turn may connect to the cellular core network.

Servers 120, 122, 124, which run the PHY and L2 layers of the vRAN stack, is typically configured to serve a fixed set of the RUs 102. The L2 layer may include the Medium Access Control (MAC) and Radio Link Control (RLC). Two aspects of the lower RAN layers can make workload estimation and workload balancing challenging: real-time latency requirements, and high software complexity. In particular, PHY processing imposes stringent tail latency requirements, requiring baseband processing tasks to be completed within strict transmission time intervals (TTIs), measuring as low as 500 µs in common 5G deployment configurations. Existing approaches that may be implemented in servers may not support such requirements, since they can require tens of milliseconds to seconds to estimate workloads and rebalance the workloads in response to an overload condition. Such downtime in PHY processing can cause severe service disruptions.

The disclosed techniques provide a workload estimation and workload balancing mechanism that (1) works transparently without modifications to the PHY, (2) detects overload conditions quickly to minimize dropped workloads, and (3) has low CPU overhead.

Figure 2A:
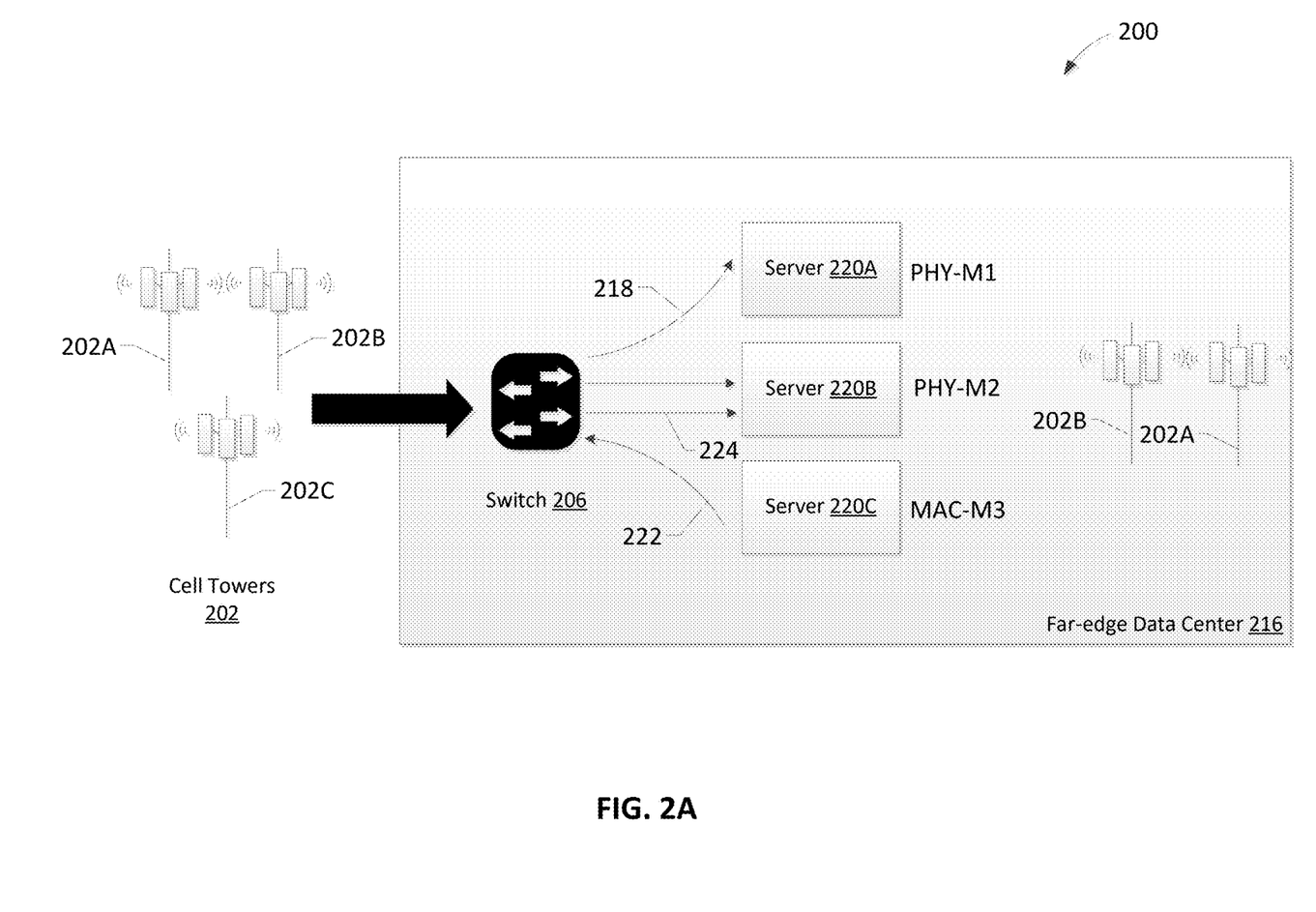
FIG. 2A depicts an example vRAN workload distribution in an embodiment of the disclosure.

FIG. 2A illustrates aspects of workload estimation and balancing by a programmable switch associated with a far-edge datacenter of a cloud RAN. As illustrated by FIG. 2A, system 200 comprises cell towers 202A-C and far-edge data center 216. Far-edge data center 216 comprises switch 206 (e.g., a programmable switch) and servers 210A-C, where each server may correspond to a vRAN instance. In an embodiment, each server 210A-C may be associated with a queue.

Switch 206 may be a programmable switch, as described above, and may execute programs encoding workflow estimation and balancing logic. The workflow estimation and balancing logic may include a prediction model. Based on information observed by the switch 206 in the current slot, the prediction model may estimate the processing time of the next slot. If an overload condition is detected, the estimation logic may rebalance workloads across servers 220. When a server transitions to an overloaded failure state, the server may become unavailable for processing workflows.

Figure 2B:
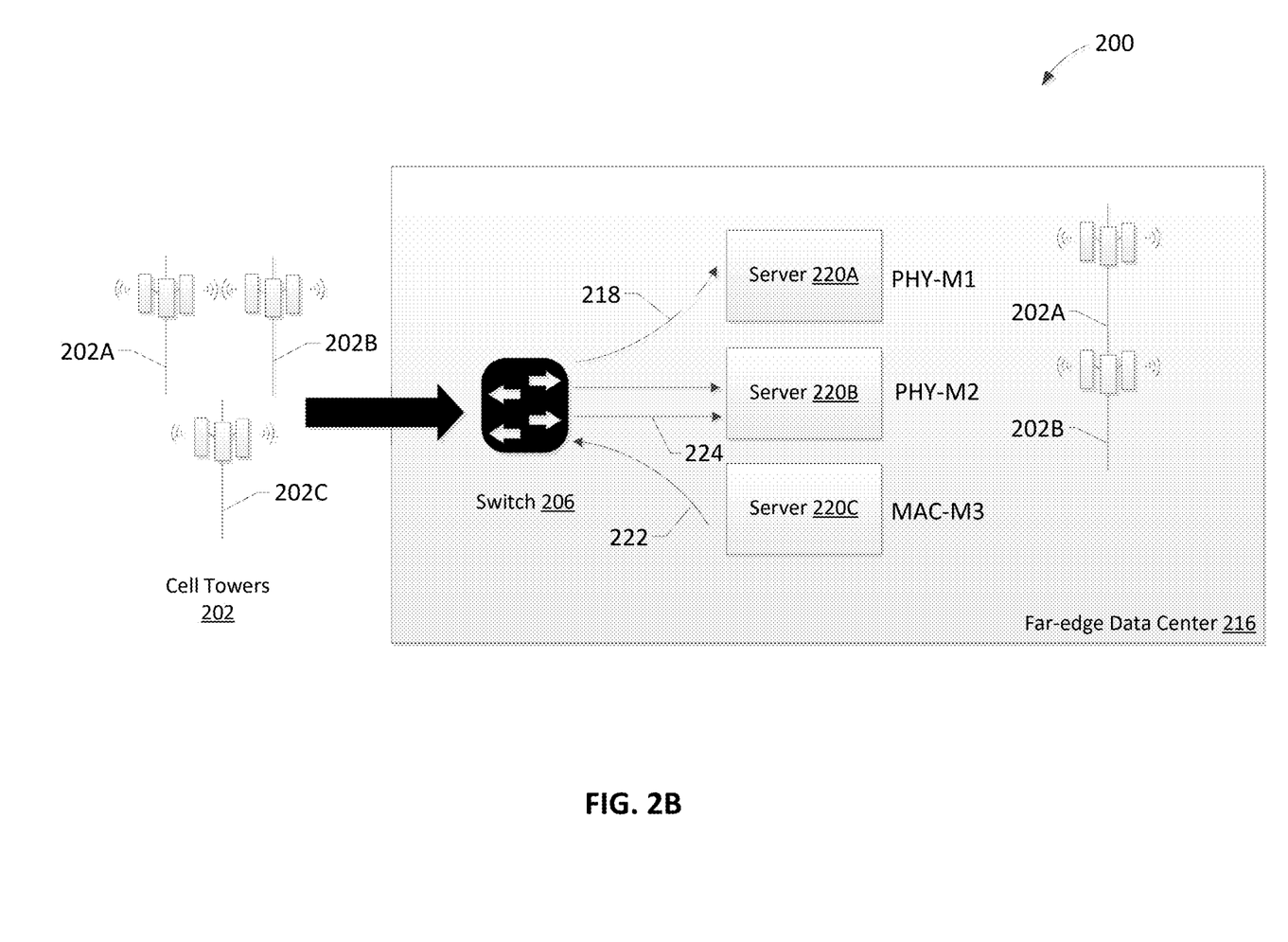
FIG. 2B depicts an example vRAN workload distribution in an embodiment of the disclosure.

Switch 206 may further be configured, based on the workflow estimation and balancing logic, to predict that in the next slot, server 220B, which is currently processing workloads associated with cell towers 202A and 202B, will become overloaded. In response, switch 206 may rebalance the workloads as shown in FIG. 2B. FIG. 2B shows that workloads associated with cell tower 202A are processed by server 220B, while workloads associated with cell tower 202B will still be processed by server 220B.

In an embodiment, switch 206 may map traffic from a particular cell tower to a particular server. In response to load balancing decisions (e.g., the cell-server mapping), switch 206 may implement the load balancing decision by altering packet headers of data traffic from the particular cell tower to specify the particular server as the destination of the data traffic. In an example, switch 206 may determine that server 220A is available and may make a decision to direct RAN data traffic from cell towers 202A and 202B to server 220A for processing. In response to the decision, switch 206 may inspect RAN-specific packet headers (e.g., cell ID, subcarrier ID, etc.) to identify data traffic from cell towers 202A and 202B and may modify the packet headers to specify server 220A as the destination. A workload performed by server 220A may comprise layer one (PHY) processing of the RAN data traffic from cell towers 202A and 202B.

Figure 3:
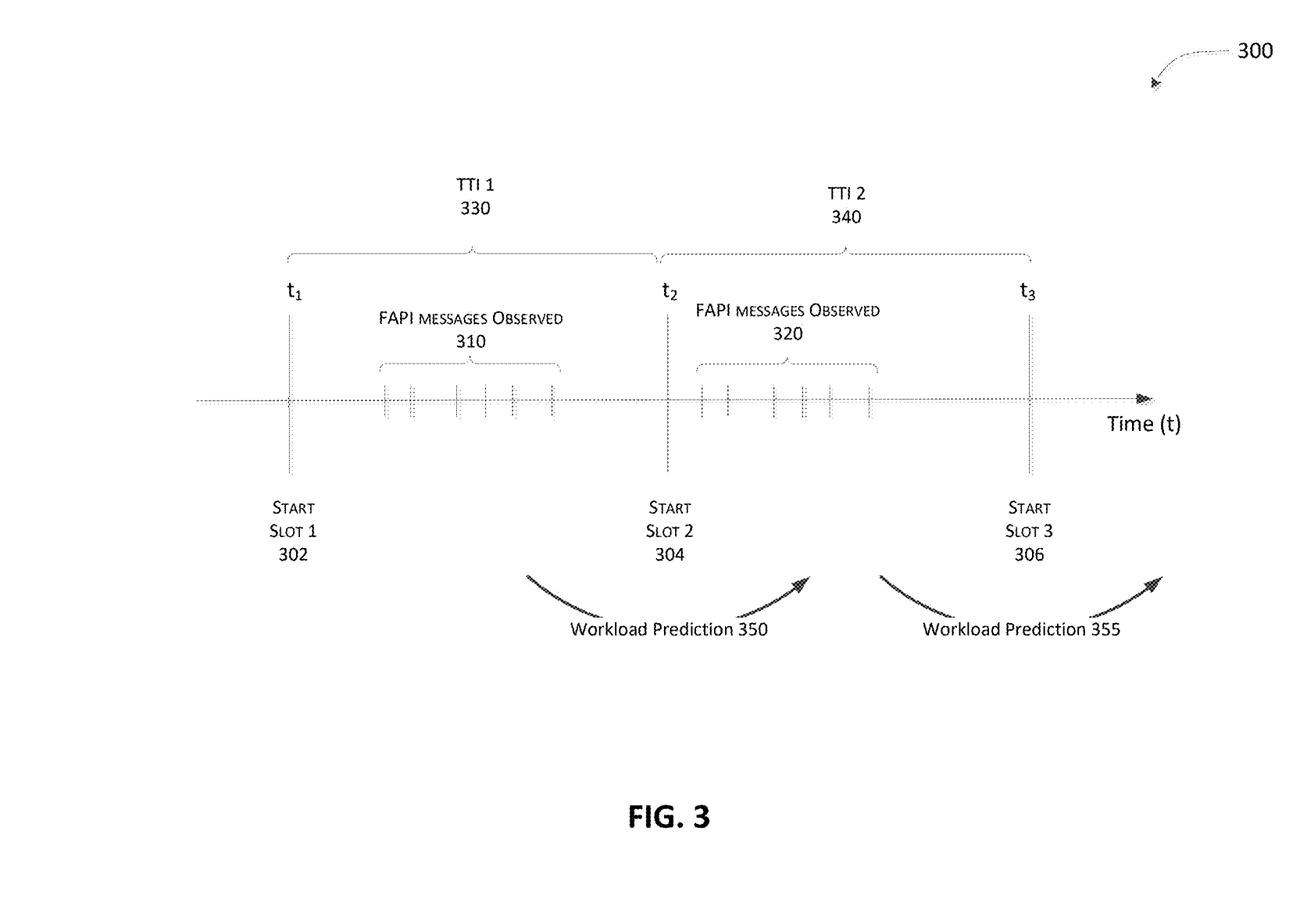
FIG. 3 depicts an example of a predicted workload in accordance with the present disclosure.

Referring to FIG. 3, illustrated is an example 300 of workload estimation and balancing in accordance with the present disclosure. $t_1$ represents the beginning of slot 1 which may be TTL 1 330, $t_2$ represents the beginning of slot 2 which may be TTL 2 340, $t_3$ represents the beginning of the next slot, and so on. During TTL 1 330, a number of FAPI messages 310 may be observed, and during TTL 2 340, a number of FAPI messages 320 may be observed. Based on the FAPI messages 310, the workload estimation and balancing logic may generate a workload prediction 350 for TTL 2 340. Based on the FAPI messages 320, the workload estimation and balancing logic may generate a workload prediction 355 for the next slot, and so on.

Figure 4A:
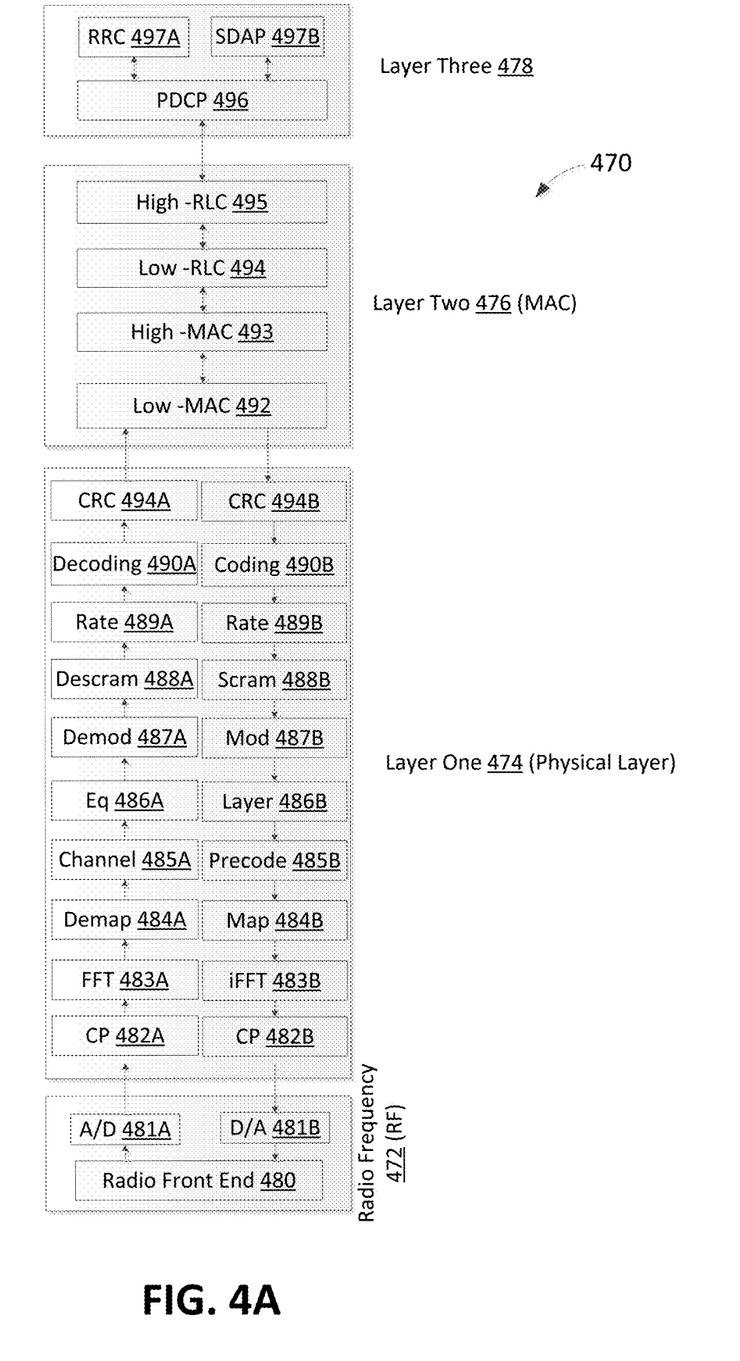
FIG. 4A depicts an example of a networked environment where aspects of the disclosure may be implemented.

Referring to FIG. 4A, operational partitions 470 illustrate various operational segments for processing data traffic in the RAN. For example, the operational partitions 482-494 may correspond to layer one (PHY) 474 processing and operational partitions 492-495 may correspond to layer two (L2) 476 processing of the Open Systems Interconnection (OSI) seven-layer model.

In an embodiment, conversion of data associated with a radio frequency 472 (RF) may occur prior to processing data at layer one 474. For radio frequency 472 (RF) data processing, the radio front-end partition may receive and send data through the cell towers 402A-C to mobile computing devices over wireless communications. The A/D 481A may convert analog data from the radio front-end to digital data for the upstream data traffic. The D/A 481B may convert digital data into analog data for the downstream data traffic. In some embodiments, the interface between DU and RU in a cloud RAN may be referred to as fronthaul. The fronthaul may define a number of planes of operations, including the c-plane (control plane), the u-plane (user plane), the s-plane (synchronization plane), and the m-plane (management plane). In general, c-plane data may be directed to scheduling and coordination of data transmission, u-plane data may be directed to efficient data transfer (e.g., defined by 5G specifications), s-plane data may be directed to timing and synchronization of data transmission between RU and DU, and m-plane data may relate to managing the RU. Packets having data payloads related to the different planes of operation may comprise corresponding header information, e.g., a c-plane header, u-plane header, etc.

Partitions in layer one 474 (physical layer) may be associated with operations for converting coded symbols associated with a bit stream into a physical signal for transmission using communication media (e.g., a physical wire or radio). In an embodiment, the operational partitions for processing upstream data traffic of the physical layer may include, CP 482A, FFT 483A, Demap 484A, Channel 485A, Eq 486A, Demod 487A, Descram 488A, Rate 489A, Decoding 490A, and CRC 494A. The operational partitions for processing downstream data traffic in the physical layer may include, CRC 494B, Coding 490A, Rate 489B, Scram 488B, Mod 487B, Layer 486B, Precode 485B, Map 484B, iFFT 483B, and CP 482B.

Partitions in layer two L2 476 (media access control—MAC) may be associated with operations for transferring data frames between network hosts over a physical link. In an embodiment, partitions in layer two L2 may correspond to the data link layer in the OSI seven-layer model. Low-MAC 492 may be the lowest partition in the layer two L2 476. Other partitions above the Low-MAC 492 may include, an ascending sequence of layers, High-MAC 493, Low-Radio Link Control (RLC) 494, and High-RLC 495.

Partitions in the layer three 478 may be associated with operations for forwarding data packets through routers. In an embodiment, layer three 478 may correspond to the network layer in the OSI seven-layer model. The partitions in layer three 478 may be associated with protocol-governed operations such as Packet Data Convergence Protocol 496 (PDCP), Radio Resource Control 497A (RRC) and Service Data Adaptation Protocol 497B (SDAP).

Figure 4B:
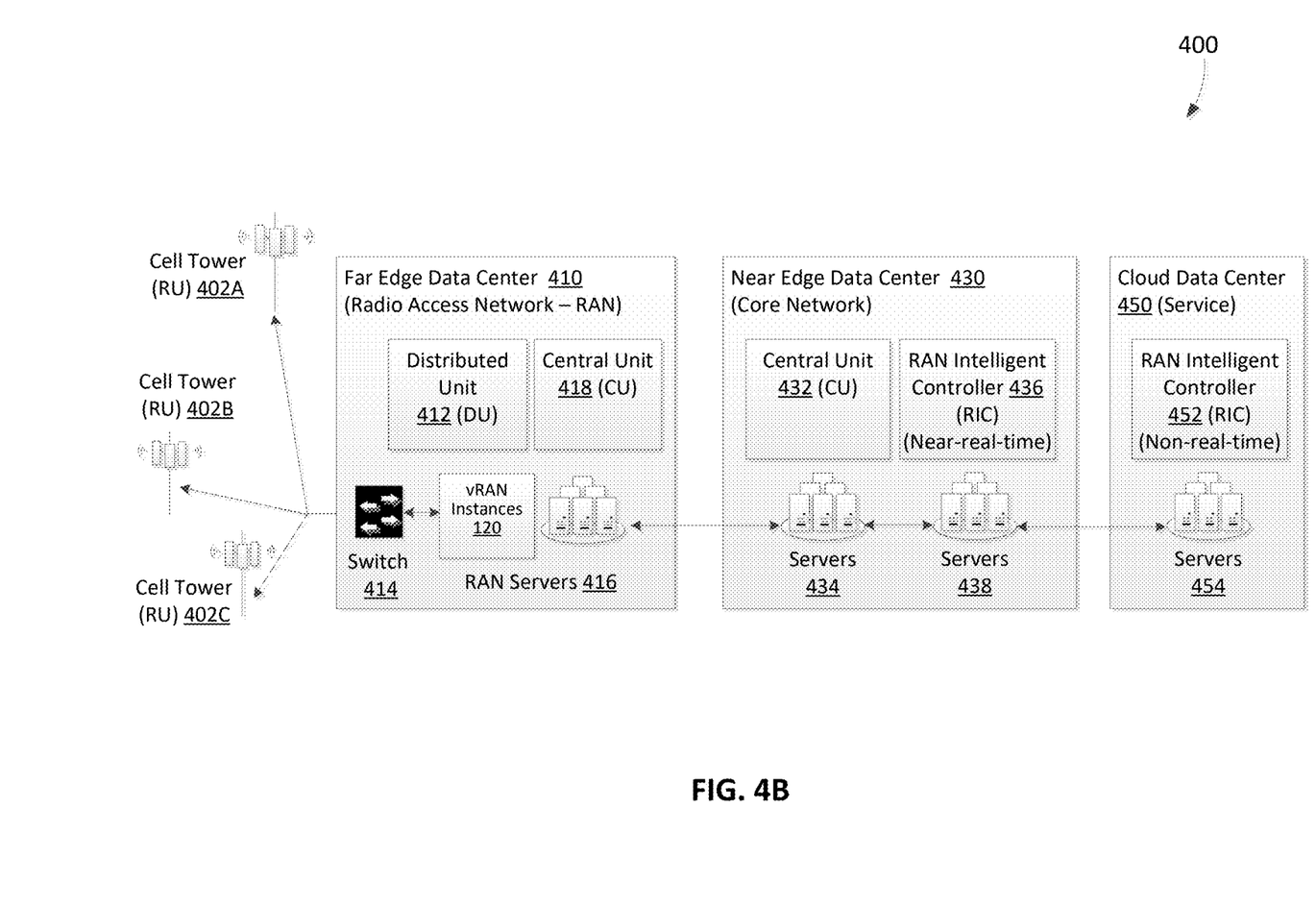
FIG. 4B depicts an example of a networked environment where aspects of the disclosure may be implemented.

Referring to FIG. 4B, in some embodiments, a combination of DU 442 and CU 418 in the far-edge datacenter 410 may process partitions associated with layer one 474, layer two 476, and at least a part of layer three 478. In particular, respective servers of RAN servers 416 may include central processors (CPUs) and a variety of accelerators for processing data associated with one or more partitions of the operational partitions 470.

As previously noted, to meet 5G requirements, layers one and two may need to be processed in essentially real time. In particular, detection of an overload condition and effecting a load balancing mechanism in a correct and timely manner is critical in the RAN in various scenarios. For example, RAN workloads may include processing IQ samples from cell towers. Quadrature signals, also called IQ signals, IQ data or IQ samples, are often used in radio frequency (RF) applications, such as a RAN. IQ samples form the basis of complex RF signal modulation and demodulation, both in hardware and in software, as well as in complex signal analysis. To facilitate transmission of this type of data, IQ samples are often compressed and are transmitted via u-plane data packets with corresponding u-plane headers. This type of RAN data requires real-time processing to meet latency and other performance metrics of 5G.

Traditionally, estimation of workloads and balancing is handled by servers running estimation and load balancing software. However, rerouting RAN traffic to such servers increases both energy and capital costs, degrades the end-to-end performance, and requires additional physical space, all of which are undesirable or even infeasible for a RAN far-edge datacenter. The present disclosure addresses this issue by the estimation of workloads and load balancing via programmable switches 112 (FIG. 1), 414 (FIG. 4B) at the far-edge datacenter 110, 410. As illustrated by FIG. 4B, switch 414 may be located in the path of data traffic at the interface between the RU and DU cloud infrastructure components.

In an embodiment, since switch 414 is in the path of the data traffic, switch 414 is able to access real-time packet, network, and resource information. By leveraging programmability of switch 414, a workflow estimation and balancing mechanism can be applied without incurring the performance, energy, and capital cost overheads of traditional server-based systems. The estimation of workloads and balancing the workloads may be customized for the RAN infrastructure. For instance, the switch 414 may be programmatically enabled to monitor, during a first transmission time interval (TTI) of the vRAN, data traffic between a radio unit (RU) of a cellular network and a first vRAN instance of the vRAN. Based on the data traffic between the RU of the cellular network and the first vRAN instance during the first TTI, a workload at the first vRAN instance during a second TTI may be estimated. The switch 414 may be programmatically enabled to determine that the first vRAN instance does not have computing capacity to process the workload during the second TTI. In response to determining that the first vRAN instance does not have computing capacity to process the workload during the second TTI, the switch 414 may be programmatically enabled to allocate the workload to a second vRAN instance executing on a second server of the vRAN. The switch 414 may be programmatically enabled to cause the workload to be processed by the second vRAN instance executing on the second server of the vRAN during the second TTI to enable the workload to be processed during the second TTI.

As will be appreciated, the various methods, devices, applications, features, etc., described with respect to FIGS. 1, 2A, 2B, 3, 4A, and 4B are not intended to limit the system 400 to being performed by the particular applications and features described. Accordingly, additional controller configurations may be used to practice the methods and systems herein and/or features and applications described may be excluded without departing from the methods and systems disclosed herein.

Figure 5:
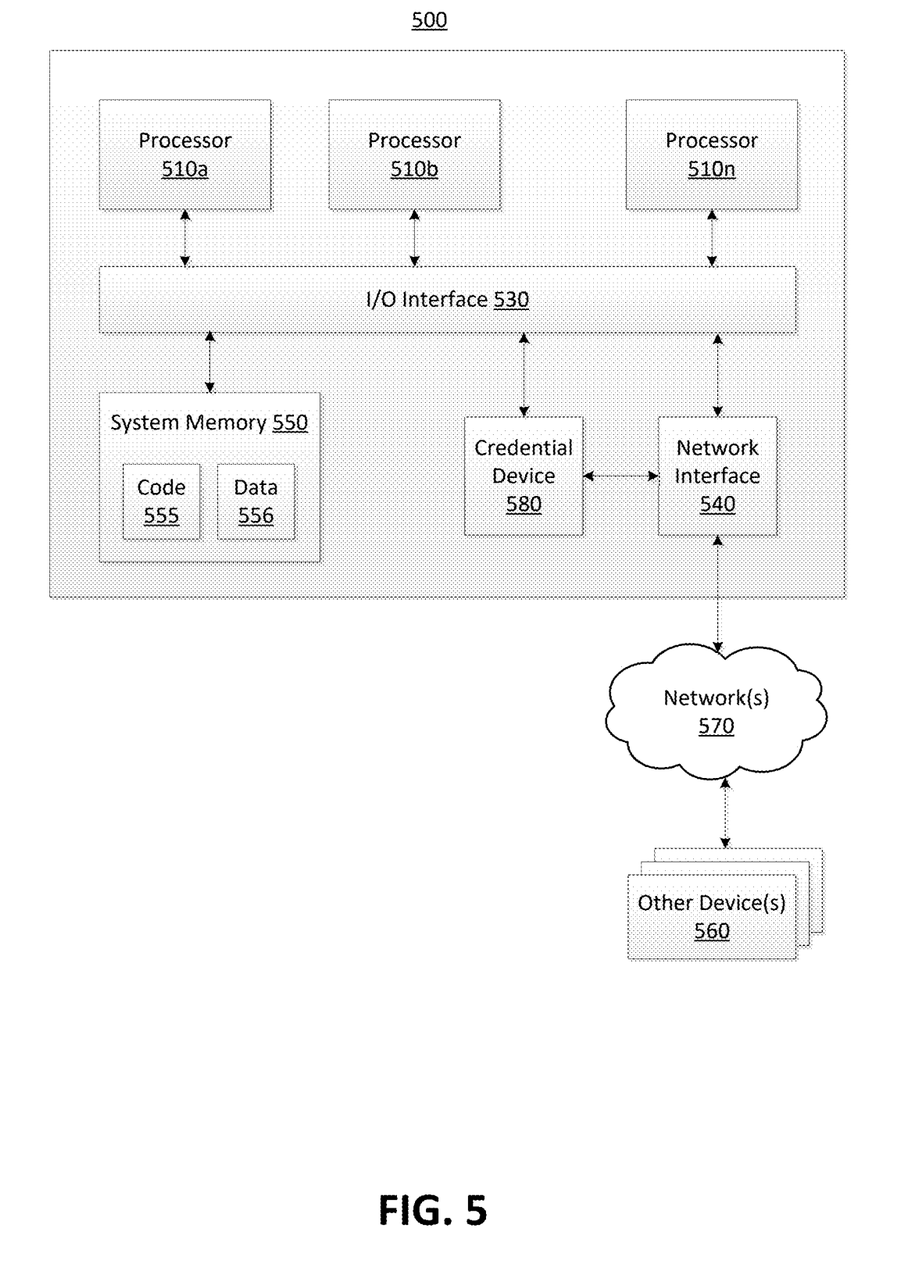
FIG. 5 depicts an example of a computing device where aspects of the disclosure may be implemented.

In at least some embodiments, a computing device that implements a portion or all of one or more of the technologies described herein may include a general-purpose computer system that includes or is configured to access one or more computer-accessible media. FIG. 5 illustrates such a general-purpose computing device 500. In the illustrated embodiment, computing device 500 includes one or more processors 510a, 510b, and/or 510n (which may be referred herein singularly as "a processor 510" or in the plural as "the processors 510") coupled to a system memory 550 via an input/output (I/O) interface 550. Computing device 500 further includes a network interface 550 coupled to I/O interface 530.

In various embodiments, computing device 500 may be a uniprocessor system including one processor 510 or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 510 may commonly, but not necessarily, implement the same ISA.

System memory 550 may be configured to store instructions and data accessible by processor(s) 510. In various embodiments, system memory 550 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 550 as code 555 and data 556.

In one embodiment, I/O interface 530 may be configured to coordinate I/O traffic between processor 510, system memory 550, and any peripheral devices in the device, including network interface 550 or other peripheral interfaces. In some embodiments, I/O interface 530 may perform any necessary protocol, timing, or other data transformations to convert data signals from one component (e.g., system memory 550) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 550, may be incorporated directly into processor 510.

Network interface 540 may be configured to allow data to be exchanged between computing device 500 and other device or devices 560 attached to a network or network(s) 570, such as other computer systems or devices as illustrated herein, for example. In various embodiments, network interface 550 may support communication via any suitable wired or wireless general data networks, such as types of Ethernet networks, for example. Additionally, network interface 540 may support communication via telecommunications/telephony networks such as analog voice networks or digital fiber communications networks, via storage area networks such as Fibre Channel SANs, cellular voice and/or data networks, or via any other suitable type of network and/or protocol.

In some embodiments, system memory 550 may be one embodiment of a computer-accessible medium configured to store program instructions and data as described herein for FIGS. 1-4B for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 500 via I/O interface 530. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 500 as system memory 550 or another type of memory. Portions or all of multiple computing devices, such as those illustrated in FIG. 5, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

The communications devices as used herein may refer to devices including, but not limited to, smartphones, cellular-enabled tablets and laptops, companion devices (e.g., smart watches), and non-consumer devices (telematics device in an automobile, cellular-connected utility meters), and the like.

Figure 6:
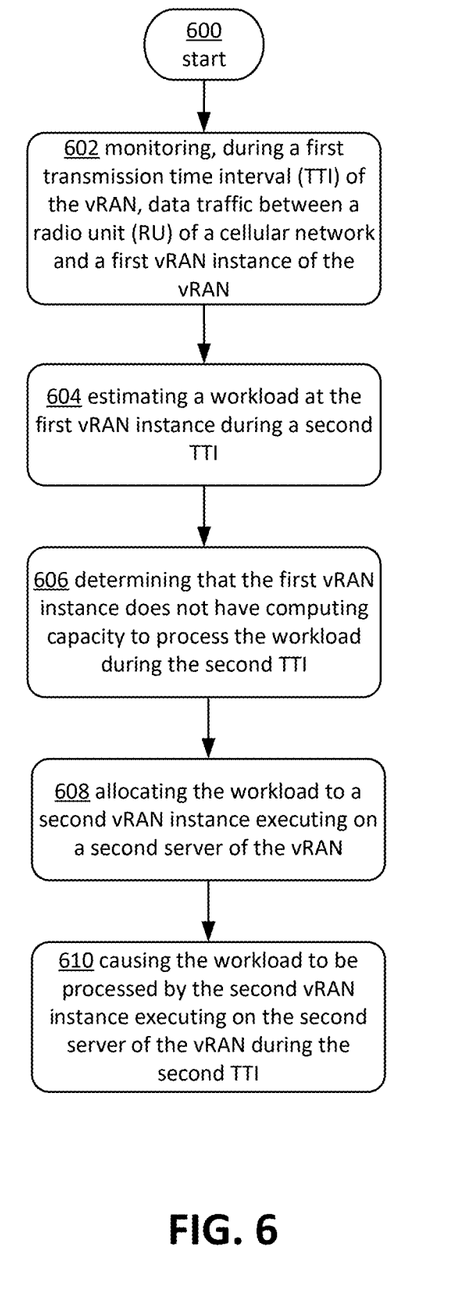
FIG. 6 depicts an operational procedure in accordance with the present disclosure.

FIG. 6 illustrates an example operational procedure for one embodiment of estimating workloads in a virtualized radio access network in accordance with this disclosure. In an embodiment, computing devices and systems may have a memory that has stored thereon computer-executable instructions that, when executed, cause the computing device to perform operations as described.

Referring to FIG. 6, operation 600 begins the operational procedure. Operation 600 may be followed by operation 602. Operation 602 illustrates monitoring, during a first transmission time interval (TTI) of the vRAN, data traffic between a radio unit (RU) of a cellular network and a first vRAN instance of the vRAN. In an embodiment, the first vRAN instance executes on a first server of the vRAN, the first vRAN instance configured to perform PHY layer processing and L2 processing of the data traffic. In an embodiment, the PHY layer is Layer 1 of the Open Systems Interconnection (OSI) model and the L2 is Layer 2 of the OSI model.

Operation 602 may be followed by operation 604. Operation 604 illustrates based on the data traffic between the RU of the cellular network and the first vRAN instance during the first TTI, estimating a workload at the first vRAN instance during a second TTI. In an embodiment, the second TTI is a next immediate TTI following the first TTI.

Operation 604 may be followed by operation 606. Operation 606 illustrates determining that the first vRAN instance does not have computing capacity to process the workload during the second TTI.

Operation 606 may be followed by operation 608. Operation 608 illustrates in response to determining that the first vRAN instance does not have computing capacity to process the workload during the second TTI, allocating the workload to a second vRAN instance executing on a second server of the vRAN.

Operation 608 may be followed by operation 610. Operation 610 illustrates causing the workload to be processed by the second vRAN instance executing on the second server of the vRAN during the second TTI to enable the workload to be processed during the second TTI.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein also encompasses the subject matter set forth in the following clauses:

Clause 1: A method for estimating workloads in a virtualized radio access network (vRAN), comprising:
  monitoring, during a first transmission time interval (TTI) of the vRAN, data traffic between a radio unit (RU) of a cellular network and a first vRAN instance of the vRAN, the first vRAN instance executing on a first server of the vRAN, the first vRAN instance configured to perform PHY layer processing and L2 processing of the data traffic, wherein the PHY layer is Layer 1 of the Open Systems Interconnection (OSI) model and the L2 is Layer 2 of the OSI model;
  based on the data traffic between the RU of the cellular network and the first vRAN instance during the first TTI, estimating a workload at the first vRAN instance during a second TTI, wherein the second TTI is a next immediate TTI following the first TTI;
  determining that the first vRAN instance does not have computing capacity to process the workload during the second TTI;
  in response to determining that the first vRAN instance does not have computing capacity to process the workload during the second TTI, allocating the workload to a second vRAN instance executing on a second server of the vRAN; and
  causing the workload to be processed by the second vRAN instance executing on the second server of the vRAN during the second TTI to enable the workload to be processed during the second TTI.

Clause 2: The method of clause 1, wherein the monitoring, estimating, and determining are performed by a programmable switch of the vRAN.

Clause 3: The method of any of clauses 1-2, wherein the data traffic comprises messages sent via a functional application platform interface (FAPI), wherein the FAPI is a standard interface between the PHY layer and the L2 layer.

Clause 4: The method of any of clauses 1-3, wherein the estimating is based on one or more of signal-to-noise ratio (SNR), type of modulation, type of coding scheme, number of channel layers used, or transmit block size.

Clause 5: The method of any of clauses 1-4, wherein the estimating is performed using a prediction model trained with the signal-to-noise ratio (SNR), type of modulation, type of coding scheme, number of channel layers used, or transmit block size, and measured processing time.

Clause 6: The method of any of clauses 1-5, wherein the determining that the first vRAN instance does not have computing capacity to process the workload during the second TTI is based on determining a time required to process the estimated workload exceeds the second TTI.

Clause 7: The method of clauses 1-6, wherein the monitoring, estimating, and determining are performed in a data plane of the vRAN.

Clause 8: The method of any of clauses 1-7, wherein the prediction model comprises a tree-based classification model.

Clause 9: A programmable switch configured to perform operations comprising:
  monitoring, during a first transmission time interval (TTI) of a vRAN, data traffic between a radio unit (RU) of a cellular network and a first vRAN instance of the vRAN, the first vRAN instance executing on a first server of the vRAN, the first vRAN instance configured to perform PHY layer processing and L2 processing of the data traffic, wherein the PHY layer is Layer 1 of the Open Systems Interconnection (OSI) model and the L2 is Layer 2 of the OSI model;

based on the data traffic between the RU of the cellular network and the first vRAN instance during the first TTI, estimating a workload at the first vRAN instance during a second TTI, wherein the second TTI is a next immediate TTI following the first TTI;

determining that the first vRAN instance does not have computing capacity to process the workload during the second TTI;

in response to determining that the first vRAN instance does not have computing capacity to process the workload during the second TTI, allocating the workload to a second vRAN instance executing on a second server of the vRAN; and causing the workload to be processed by the second vRAN instance executing on the second server of the vRAN during the second TTI.

Clause 10: The programmable switch of clause 9, wherein the data traffic comprises messages sent via a functional application platform interface (FAPI), wherein the FAPI is a standard interface between the PHY layer and the L2 layer.

Clause 11: The programmable switch of any of clauses 9 and 10, wherein the estimating is based on one or more of signal-to-noise ratio (SNR), type of modulation, type of coding scheme, number of channel layers used, or transmit block size.

Clause 12: The programmable switch of any clauses 9-11, wherein the estimating is performed using a prediction model trained with the signal-to-noise ratio (SNR), type of modulation, type of coding scheme, number of channel layers used, or transmit block size, and measured processing time.

Clause 13: The programmable switch of any clauses 9-12, wherein the monitoring, estimating, and determining are performed in a data plane of the programmable switch.

Clause 14: The programmable switch of any clauses 9-13, wherein the prediction model comprises a tree-based classification model.

Clause 15: A virtualized radio access network (vRAN) comprising:
a programmable switch; and
a server configured to execute a vRAN instance;
the programmable switch configured to:
monitor, during a first transmission time interval (TTI) of the vRAN, data traffic between a radio unit (RU) of a cellular network and a first vRAN instance executing on a first server, the first vRAN instance configured to perform PHY layer processing and L2 processing of the data traffic, wherein the PHY layer is Layer 1 of the Open Systems Interconnection (OSI) model and the L2 is Layer 2 of the OSI model;
based on the data traffic between the RU of the cellular network and the first vRAN instance during the first TTI, estimate a workload at the first vRAN instance during a second TTI, wherein the second TTI is a next immediate TTI following the first TTI;
determine that the first vRAN instance does not have computing capacity to process the workload during the second TTI;
in response to determining that the first vRAN instance does not have computing capacity to process the workload during the second TTI, allocate the workload to a second vRAN instance executing on a second server; and
cause the workload to be processed by the second vRAN instance executing on the second server of the vRAN during the second.

Clause 16: The vRAN of clause 15, wherein the data traffic comprises messages sent via a functional application platform interface (FAPI), wherein the FAPI is a standard interface between the PHY layer and the L2 layer.

Clause 17: The vRAN of any of clauses 15 and 16, wherein the estimating is based on one or more of signal-to-noise ratio (SNR), type of modulation, type of coding scheme, number of channel layers used, or transmit block size.

Clause 18: The vRAN of any of the clauses 15-17, wherein the estimating is performed using a prediction model trained with the signal-to-noise ratio (SNR), type of modulation, type of coding scheme, number of channel layers used, or transmit block size, and measured processing time.

Clause 19: The vRAN of any of the clauses 15-18, wherein the monitoring, estimating, and determining are performed in a data plane of the programmable switch.

Clause 20: The vRAN of any of the clauses 15-19, wherein the prediction model comprises a tree-based classification model.

What is claimed is:

1. A method for estimating workloads in a virtualized radio access network (vRAN), comprising:
monitoring, during a first transmission time interval (TTI) of the vRAN, data traffic between a radio unit (RU) of a cellular network and a first vRAN instance of the vRAN, the first vRAN instance executing on a first server of the vRAN, the first vRAN instance configured to perform PHY layer processing and L2 processing of the data traffic, wherein the PHY layer is Layer 1 of the Open Systems Interconnection (OSI) model and the L2 is Layer 2 of the OSI model, and wherein the TTI is a smallest time duration over which data is scheduled and transmitted between a base station of the cellular network (gNodeB or eNodeB) and user equipment (UE);
based on the data traffic between the RU of the cellular network and the first vRAN instance during the first TTI, estimating a workload at the first vRAN instance during a second TTI, wherein the second TTI is a next immediate TTI following the first TTI;
determining that the first vRAN instance does not have computing capacity to process the workload during the second TTI based on determining that a time required to process the estimated workload exceeds the second TTI;
in response to determining that the first vRAN instance does not have computing capacity to process the workload during the second TTI, allocating the workload to a second vRAN instance executing on a second server of the vRAN; and
causing the workload to be processed by the second vRAN instance executing on the second server of the vRAN during the second TTI.

2. The method of claim 1, wherein the monitoring, estimating, and determining are performed by a programmable switch of the vRAN.

3. The method of claim 1, wherein the data traffic comprises messages sent via a functional application platform interface (FAPI), wherein the FAPI is a standard interface between the PHY layer and the L2.

4. The method of claim 3, wherein the estimating is based on one or more of signal-to-noise ratio (SNR), type of modulation, type of coding scheme, number of channel layers used, or transmit block size.

5. The method of claim 4, wherein the estimating is performed using a prediction model trained with the signal-to-noise ratio (SNR), type of modulation, type of coding scheme, number of channel layers used, or transmit block size, and measured processing time.

6. The method of claim 1, wherein the monitoring, estimating, and determining are performed in a data plane of the vRAN.

7. The method of claim 5, wherein the prediction model comprises a tree-based classification model.

8. A programmable switch configured to perform operations comprising:
    monitoring, during a first transmission time interval (TTI) of a vRAN, data traffic between a radio unit (RU) of a cellular network and a first vRAN instance of the vRAN, the first vRAN instance executing on a first server of the vRAN, the first vRAN instance configured to perform PHY layer processing and L2 processing of the data traffic, wherein the PHY layer is Layer 1 of the Open Systems Interconnection (OSI) model and the L2 is Layer 2 of the OSI model, and wherein the TTI is a smallest time duration over which data is scheduled and transmitted between a base station of the cellular network (gNodeB or eNodeB) and user equipment (UE);
    based on the data traffic between the RU of the cellular network and the first vRAN instance during the first TTI, estimating a workload at the first vRAN instance during a second TTI, wherein the second TTI is a next immediate TTI following the first TTI;
    determining that the first vRAN instance does not have computing capacity to process the workload during the second TTI based on determining that a time required to process the estimated workload exceeds the second TTI;
    in response to determining that the first vRAN instance does not have computing capacity to process the workload during the second TTI, allocating the workload to a second vRAN instance executing on a second server of the vRAN; and
    causing the workload to be processed by the second vRAN instance executing on the second server of the vRAN during the second TTI.

9. The programmable switch of claim 8, wherein the data traffic comprises messages sent via a functional application platform interface (FAPI), wherein the FAPI is a standard interface between the PHY layer and the L2.

10. The programmable switch of claim 9, wherein the estimating is based on one or more of signal-to-noise ratio (SNR), type of modulation, type of coding scheme, number of channel layers used, or transmit block size.

11. The programmable switch of claim 10, wherein the estimating is performed using a prediction model trained with the signal-to-noise ratio (SNR), type of modulation, type of coding scheme, number of channel layers used, or transmit block size, and measured processing time.

12. The programmable switch of claim 8, wherein the monitoring, estimating, and determining are performed in a data plane of the programmable switch.

13. The programmable switch of claim 11, wherein the prediction model comprises a tree-based classification model.

14. A system comprising:
    a programmable switch; and
    a plurality of servers configured to execute a plurality of virtualized radio access network (vRAN) instances of a vRAN;
    the programmable switch configured to:
    monitor, during a first transmission time interval (TTI) of the vRAN, data traffic between a radio unit (RU) of a cellular network and a first vRAN instance executing on a first server, the first vRAN instance configured to perform PHY layer processing and L2 processing of the data traffic, wherein the PHY layer is Layer 1 of the Open Systems Interconnection (OSI) model and the L2 is Layer 2 of the OSI model, and wherein the TTI is a smallest time duration over which data is scheduled and transmitted between a base station of the cellular network (gNodeB or eNodeB) and user equipment (UE);
    based on the data traffic between the RU of the cellular network and the first vRAN instance during the first TTI, estimate a workload at the first vRAN instance during a second TTI, wherein the second TTI is a next immediate TTI following the first TTI;
    determine that the first vRAN instance does not have computing capacity to process the workload during the second TTI based on determining that a time required to process the estimated workload exceeds the second TTI;
    in response to determining that the first vRAN instance does not have computing capacity to process the workload during the second TTI, allocate the workload to a second vRAN instance executing on a second server; and
    cause the workload to be processed by the second vRAN instance executing on the second server of the vRAN during the second TTI.

15. The system of claim 14, wherein the data traffic comprises messages sent via a functional application platform interface (FAPI), wherein the FAPI is a standard interface between the PHY layer and the L2.

16. The system of claim 15, wherein the estimating is based on one or more of signal-to-noise ratio (SNR), type of modulation, type of coding scheme, number of channel layers used, or transmit block size.

17. The system of claim 16, wherein the estimating is performed using a prediction model trained with the signal-to-noise ratio (SNR), type of modulation, type of coding scheme, number of channel layers used, or transmit block size, and measured processing time.

18. The system of claim 17, wherein the monitoring, estimating, and determining are performed in a data plane of the programmable switch.

19. The system of claim 17, wherein the prediction model comprises a tree-based classification model.

* * * * *